United States Patent
Koli

(10) Patent No.: US 9,135,626 B2
(45) Date of Patent: Sep. 15, 2015

(54) ADVERTISING MIDDLEWARE

(75) Inventor: Ari Koli, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 2544 days.

(21) Appl. No.: 11/428,001

(22) Filed: Jun. 30, 2006

(65) Prior Publication Data

US 2008/0004952 A1  Jan. 3, 2008

(51) Int. Cl.
*G06Q 30/02* (2012.01)
(52) U.S. Cl.
CPC ............ *G06Q 30/02* (2013.01); *G06Q 30/0257* (2013.01); *G06Q 30/0267* (2013.01)
(58) Field of Classification Search
USPC .......................................................... 705/14
See application file for complete search history.

(56) References Cited

U.S. PATENT DOCUMENTS

| 6,487,538 | B1 | 11/2002 | Gupta et al. | |
|---|---|---|---|---|
| 7,013,290 | B2 * | 3/2006 | Ananian | 705/26.42 |
| 7,103,563 | B1 * | 9/2006 | Voisin et al. | 705/14.54 |
| 7,151,764 | B1 * | 12/2006 | Heinonen et al. | 370/338 |
| 7,343,317 | B2 * | 3/2008 | Jokinen et al. | 705/14.64 |
| 2002/0083067 | A1 * | 6/2002 | Tamayo et al. | 707/100 |
| 2002/0128903 | A1 * | 9/2002 | Kernahan | 705/14 |
| 2003/0149975 | A1 * | 8/2003 | Eldering et al. | 725/34 |
| 2004/0103027 | A1 * | 5/2004 | Yamamoto et al. | 705/14 |
| 2004/0103028 | A1 * | 5/2004 | Littman et al. | 705/14 |
| 2004/0259553 | A1 * | 12/2004 | Delaney et al. | 455/445 |
| 2005/0131761 | A1 * | 6/2005 | Trika et al. | 705/14 |
| 2005/0132049 | A1 * | 6/2005 | Inoue et al. | 709/225 |
| 2006/0111979 | A1 * | 5/2006 | Chu | 705/14 |
| 2006/0116926 | A1 * | 6/2006 | Chen | 705/14 |
| 2007/0100690 | A1 * | 5/2007 | Hopkins | 705/14 |
| 2007/0116227 | A1 * | 5/2007 | Vitenson et al. | 379/207.02 |
| 2007/0255653 | A1 * | 11/2007 | Tumminaro et al. | 705/39 |

FOREIGN PATENT DOCUMENTS

| EP | 1524611 | 4/2005 |
|---|---|---|
| WO | WO 03/065596 A2 | 8/2003 |
| WO | WO 2005/101864 A2 | 10/2005 |

OTHER PUBLICATIONS

Google, Inc., Google Adsence, Google Builds World's Largest Advertising and Search Monetization Program "Company Introduces Automate Content-Targeted Ads; Advertising Customer Base Surpasses 100,000", Mar. 4, 2003, http://www.google.com/adsense/.

(Continued)

*Primary Examiner* — Jami A Plucinski
*Assistant Examiner* — Rodney Henry
(74) *Attorney, Agent, or Firm* — Ditthavong & Steiner, P.C.

(57) ABSTRACT

A method and system for facilitating interaction with one or more advertisement functionalities is provided. An advertisement middleware provides advertisement functionalities for interfacing with one or more systems and components of an underlying device. The advertisement middleware includes a transport layer, an application programming interface and one or more functional modules. The functional modules may include a player module, a cache, a report module, a profile module, a loyalty module and a payment module. Each module may perform various advertising tasks for an advertisement application. In addition, use of a particular advertisement application may be tracked to provide incentives to developers to create advertisement applications.

28 Claims, 6 Drawing Sheets

(56) References Cited

OTHER PUBLICATIONS

International Preliminary Report on Patentability for International Application No. PCT/IB2007/001541 mailed Dec. 31, 2008, 7 pages.
Russian Office action for corresponding RU App. No. 2009101464/09(001811) dated Apr. 13, 2010, pp. 1-8.
European Office action for corresponding EP application No. 07734933.0-2221 dated Mar. 22, 2011, 1 page.
Extended European search report for corresponding EP application No. 07734933.0-2221 dated Mar. 3, 2011, pp. 1-7.
Notice from the European Patent Office dated Oct. 1, 2007 Concerning Business Methods, Official Journal EPO, Nov. 2007, pp. 592-593.
Chinese Office action for corresponding CN application No. 200780028463.7 dated Nov. 25, 2010, pp. 1-10.
Russian Office action for corresponding RU application No. 2009101464/08(001811) dated Nov. 26, 2010, pp. 1-6.
Canadian Office Action for related Canadian Application No. 2656195 dated Jan. 19, 2015, 6 pages.
Office Action for related European Patent Application No. 07 734 933.0 dated Jul. 23, 2012, pp. 1-5.
Office Action for related Canadian Patent Application No. 2,656,195 dated Jul. 26, 2013.
Chinese Office action for corresponding CN application No. 200780028463.7, Jun. 22, 2011, pp. 1-11.
Office Action for related Canadian Application No. 2,656,195 dated Mar. 30, 2012, pp. 1-3.
Rejection Decision for related Chinese Application No. 200780028463.7 dated Apr. 20, 2012, pp. 1-8.
First Examination Report for Indian Application No. 10700/DELNP/2008, mailed Feb. 23, 2015, 2 pages.

* cited by examiner

US 9,135,626 B2

ADVERTISING MIDDLEWARE

FIELD OF ART

The invention relates generally to a method and a system for facilitating the distribution and access of electronic information. Specifically, the invention relates to a system and method for providing advertising information to applications.

BACKGROUND

Advertising-supported applications are increasing in popularity as advertisers and companies strive for new ways to reach the public or a specified segment thereof. Advertising-supported application or adware is any software package which automatically plays, displays, or downloads advertising material to a computer after the software is installed on it or while the application is being used. Advertising-supported applications are often small and unobtrusive to attract more users and appear less invasive. Companies often offer greater discounts or special offers through these applications as an incentive to use the advertising applications. Advertising-supported applications have been developed for computing devices such as desktop computers, laptops and even mobile devices, such as Personal Data Assistants (PDAs) and cellular phones.

However, with the ever increasing number of types and brands of computing devices, developers of advertising-supported applications often need to program the applications specifically for each device or architecture. Programming applications for each different type of device or architecture can be time consuming, complex and costly for not only the developers but for the companies funding such ventures. As such, some advertising applications may only exist for certain devices or types of devices, limiting the reach of some advertisements. Further, downloading applications that are not specifically designed for a user's device may cause significant technical issues with the device.

For the foregoing reasons, a system and method of facilitating access to advertising functionality is needed.

SUMMARY

Many of the aforementioned problems are solved by providing a method and system that provides an application programming interface for facilitating advertisement functionality. Application developers may create applications using functions and hooks provided by a standardized advertisement middleware. The advertisement middleware provides the functionality to interface with hardware and software components associated with a particular device. As such, application developers do not need to cater their programming to a particular device or type of device. The advertisement middleware may contain various modules including an advertisement player, an advertisement cache, reporting, profiling, loyalty tracker and a payment component. Each module facilitates certain functions associated with displaying or otherwise providing an advertisement to an application. For example, the player module may include programming that instructs a display of the underlying device to display or play one or more advertisements. The cache may store advertisements for faster retrieval.

In accordance with another aspect, the application middleware may track loyalty of a user to a certain company or type of advertisement. A user may earn loyalty credit if, for example, they view and/or click multiple advertisements from a certain company over a specified period of time. Alternatively, loyalty credit may be earned if a user purchases a product that is advertised.

In accordance with still another aspect, the middleware may further include a transport layer that implements multiple transport protocols. With the transport layer, communications between an application and a content server, for example, may be significantly streamlined. In particular, applications might not be required to know which servers use which communication protocol. As such, applications may retrieve advertisements from a variety of servers using different communication protocols.

In yet another aspect, advertising middleware may provide a payment model for developers. Specifically, advertising middleware may keep track of clickthroughs or other forms of access of advertisements for each advertising application. Based on the number of click-throughs associated with a particular advertising application, the developer of the advertising application may be rewarded a specified payment. Thus, various advertising payment models may be developed based on the effectiveness of advertising applications. The incentives may further motivate development of additional advertising applications.

These as well as other advantages and aspects of the invention are apparent and understood from the following detailed description of the invention, the attached claims, and the accompanying drawings.

BRIEF DESCRIPTION OF THE DRAWINGS

The present invention is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
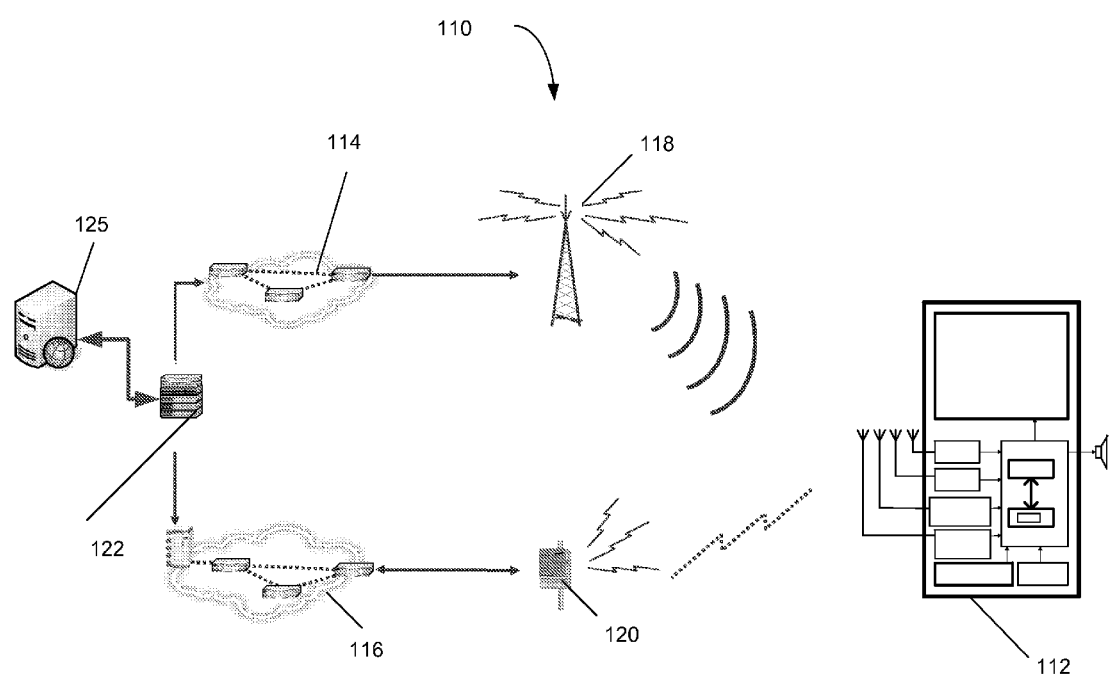
FIG. 1 illustrates a block diagram of a wireless communication system in which various embodiments may be implemented.

Aspects of the present invention may be utilized across a broad array of networks and communication protocols. FIG. 1 illustrates an example of a wireless communication system 110 in which systems and methods according to at least some embodiments may be employed. One or more network-enabled mobile devices 112, such as a personal digital assistant (PDA), cellular telephone, mobile terminal, personal video recorder, portable television, personal computer, digital camera, digital camcorder, portable audio device, portable radio, or combinations thereof, are in communication with a service source 122 through a broadcast network 114 (which may include the Internet or similar network) and/or a cellular network 116. The mobile terminal/device 112 may include a digital broadband broadcast receiver device. The service source 122 may be connected to several service providers such as advertisement source 125 that may provide their actual program content or information or description of their services and programs to the service source 122 that further provides the content or information to the mobile device 112. The several service providers including advertisement source 125 may include but are not limited to one or more television and/or digital television service providers, AM/FM radio service providers, advertisement servers and/or providers, SMS/MMS push service providers, Internet content or access providers.

In one or more arrangements, broadcast network 114 may broadcast advertisements from one or more service sources such as service source 122. Service source 122 may obtain or receive advertisements from an advertisement server or provider. The advertisements may then be received by mobile terminal 112 through the broadcast network 114 and stored in a database for display to a user of terminal 112. In one example, a broadcast service source 122 may obtain revenue from displaying advertisements in their broadcasts. As such, the broadcast service source 122 may periodically retrieve advertisements from an advertisement source 125 or database and broadcast the advertisement to a user population subscribed to the broadcast service. One method of broadcasting data is using IP datacasting (IPDC). IPDC combines digital broadcasting and Internet Protocol. As such, a variety of information and services may be transmitted using such a network and protocol.

The mobile device 112 may also send and receive messages to and from the service source 122 through the cellular network 116. The cellular network 116 may include a wireless network and a base transceiver station transmitter 120. The cellular network may include a second/third-generation (2G/3G) cellular data communications network, a Global System for Mobile communications network (GSM), a Universal Mobile Telecommunications System (UMTS) and/or other wireless communication network such as a WLAN network. In one or more aspects, communications through the cellular network 116 may allow a service source 122 to distribute advertisements on an individual basis. That is, rather than broadcasting advertisements to an entire subscriber population, the service source 122 may obtain and distribute advertisements from an advertising source 125 based on user interests, usage statistics, a user's most frequent time of use and the like. Alternatively or additionally, mobile device 112 may access either the broadcast network 114 or cellular network 116 to retrieve advertisements or other forms of content from a server or content provider 122. In one example, device 112 may request additional advertisements from an advertisement server 125 in response to determining that no advertisements are stored in device 112.

In accordance with one aspect of the invention, mobile device 112 may include a wireless interface configured to send and/or receive digital wireless communications within cellular network 116 using base transceiver station transmitter 120. The information received by mobile device 112 through the cellular network 116 or broadcast network 114 via a cellular network tower 118 may include user input or selection (for example, in an interactive transmission), applications, services, electronic images, content requests, audio clips, video clips, and/or WTAI (Wireless Telephony Application Interface) messages. As part of cellular network 116, one or more base stations (not shown) may support digital communications with receiver device 112 while the receiver device is located within the administrative domain of cellular network 116.

Figure 2:
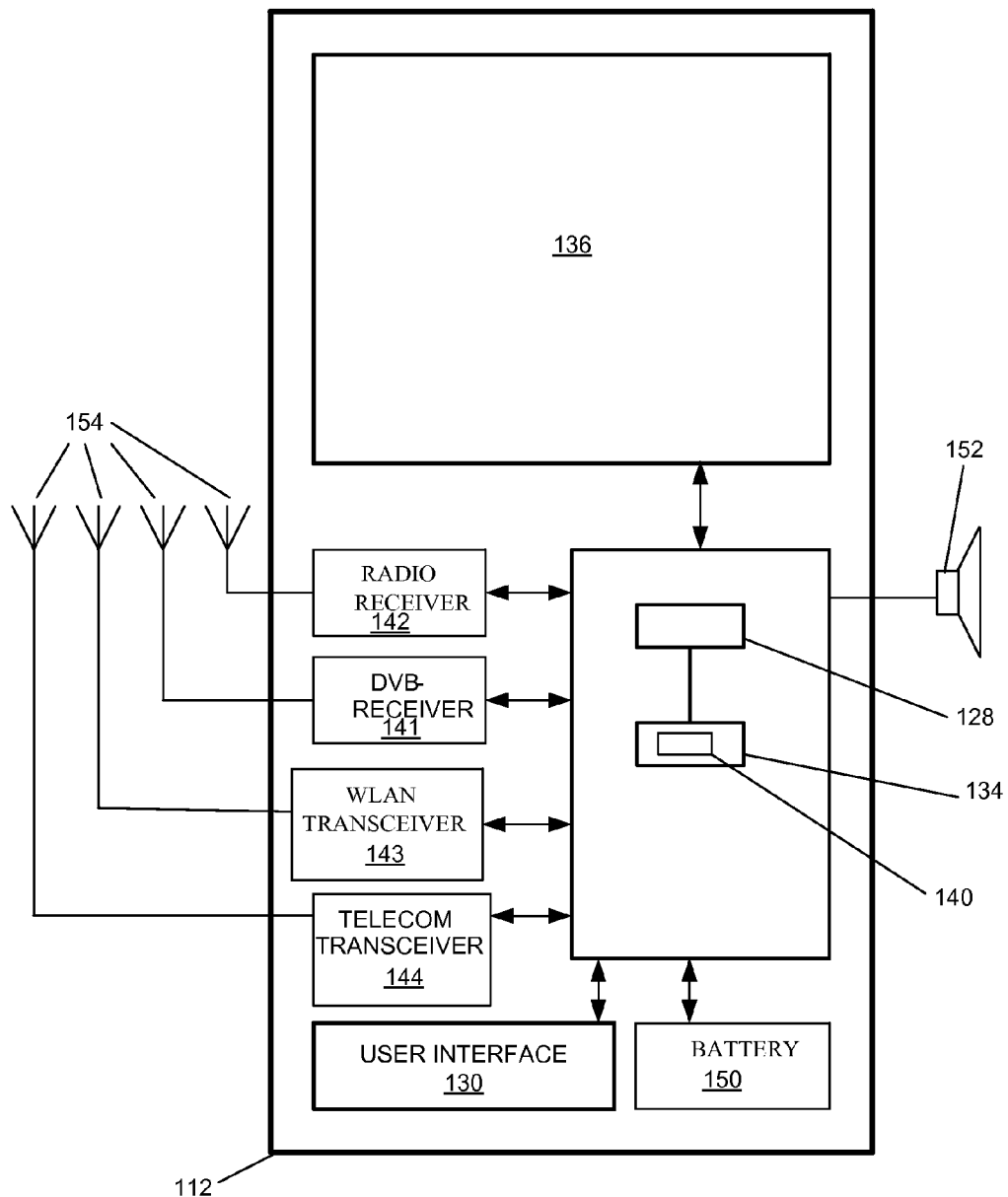
FIG. 2 illustrates a mobile terminal in which one or more illustrative embodiments may be implemented.

As shown in FIG. 2, mobile device 112 may include processor 128 connected to user interface 130, memory 134 and/or other storage, and display 136. Mobile device 112 may also include battery 150, speaker 152 and antennas 154. User interface 130 may further include a keypad, touch screen, voice interface, four arrow keys, joy-stick, stylus, data glove, mouse, roller ball, touch screen, or the like. In addition, user interface 130 may include the entirety of or portion of display 136.

Computer executable instructions and data used by processor 128 and other components within mobile device 112 may be stored in a computer readable memory 134. The memory may be implemented with any combination of read only memory modules or random access memory modules, optionally including both volatile and nonvolatile memory. Software 140 may be stored within memory 134 and/or storage to provide instructions to processor 128 for enabling mobile device 112 to perform various functions. Alternatively, some or all of the computer executable instructions may be embodied in hardware or firmware (not shown).

Mobile device 112 may be configured to receive, decode and process digital broadband broadcast transmissions that are based, for example, on the Digital Video Broadcast (DVB) standard, such as DVB-H, DVB-T or DVB-MHP, through a specific DVB receiver 141. The mobile device may also be provided with other types of receivers for digital broadband broadcast transmissions. Additionally, receiver device 112 may also be configured to receive, decode and process transmissions through FM/AM Radio receiver 142, WLAN transceiver 143, and telecommunications transceiver 144. In one aspect of the invention, mobile device 112 may receive radio data stream (RDS) messages.

In an example of the DVB standard, one DVB 10 Mbit/s transmission may have 200, 50 kbit/s audio program channels or 50, 200 kbit/s video (TV) program channels. The mobile device 112 may be configured to receive, decode, and process transmission based on the Digital Video Broadcast-Handheld (DVB-H) standard or other DVB standards, such as DVB-Multimedia Home Platform, DVB-Satellite (DVB-S), DVB-Terrestrial (DVB-T) or DVB-Cable (DVB-C). Similarly, other digital transmission formats may alternatively be used to deliver content and information of availability of supplemental services, such as ATSC (Advanced Television Systems Committee), NTSC (National Television System Committee), ISDB-T (Integrated Services Digital Broadcasting—Terrestrial), DAB (Digital Audio Broadcasting), DMB (Digital Multimedia Broadcasting), FLO (Forward Link Only) or DIRECTV. Additionally, the digital transmission may be time sliced, such as in DVB-H technology. Time-slicing may reduce the average power consumption of a mobile terminal and may enable smooth and seamless handover. Time-slicing consists of sending data in bursts using a higher instantaneous bit rate as compared to the bit rate required if the data were transmitted using a traditional streaming mechanism. In this case, the mobile device 112 may have one or more buffer memories for storing the decoded time sliced transmission before presentation. The power of receiver between bursts may be turned off to reduce power consumption.

In one or more configurations, a user of a mobile device may agree to receive advertisements on her mobile device. For example, a user may download a widget application that provides deals or discounts for allowing advertisements from organizations or companies to be displayed on the user's device. To facilitate the display of advertisements in widget applications and other applications, the user's mobile terminal may include an advertisement middleware that provides a widget or application API that allows an application to call standardized functions for retrieving advertisements or performing other advertising tasks. A widget, as used herein, relates to a user interface element and/or application that provides information such as advertising or weather information to a user based on a variety of factors such as user preferences. Examples of advertising widgets and other advertising applications are described in a U.S. patent application Ser. No. 11/453,146, entitled "AUCTIONS FOR WIDGET SPACE," filed Jun. 15, 2006, the content of which is hereby incorporated by reference in its entirety.

Middleware, in general, refers to an entity that facilitates interaction between software and/or hardware components. For example, a middleware may perform processes such as mediation between an application and a network to manage the interaction between disparate applications across heterogeneous platforms. The advertisement middleware described herein provides a variety of functionalities associated with the display and retrieval of advertisements. In particular, the middleware relieves the widget or other application from having to implement the middleware functionalities. Instead, the application may call various functions of the middleware to accomplish various advertisement tasks or processes. Advertisement middleware may be stored in a computer readable medium 134 in a user's mobile terminal 112 along one or more advertisement applications that may interface with the middleware. The advertisement application or widget may display advertisements or other information on display 136. Advertisement middleware may also include components for interfacing with one or more hardware components such as WLAN transceiver 143, telecom transceiver 144 and display 136 to perform one or more tasks.

Figure 3:
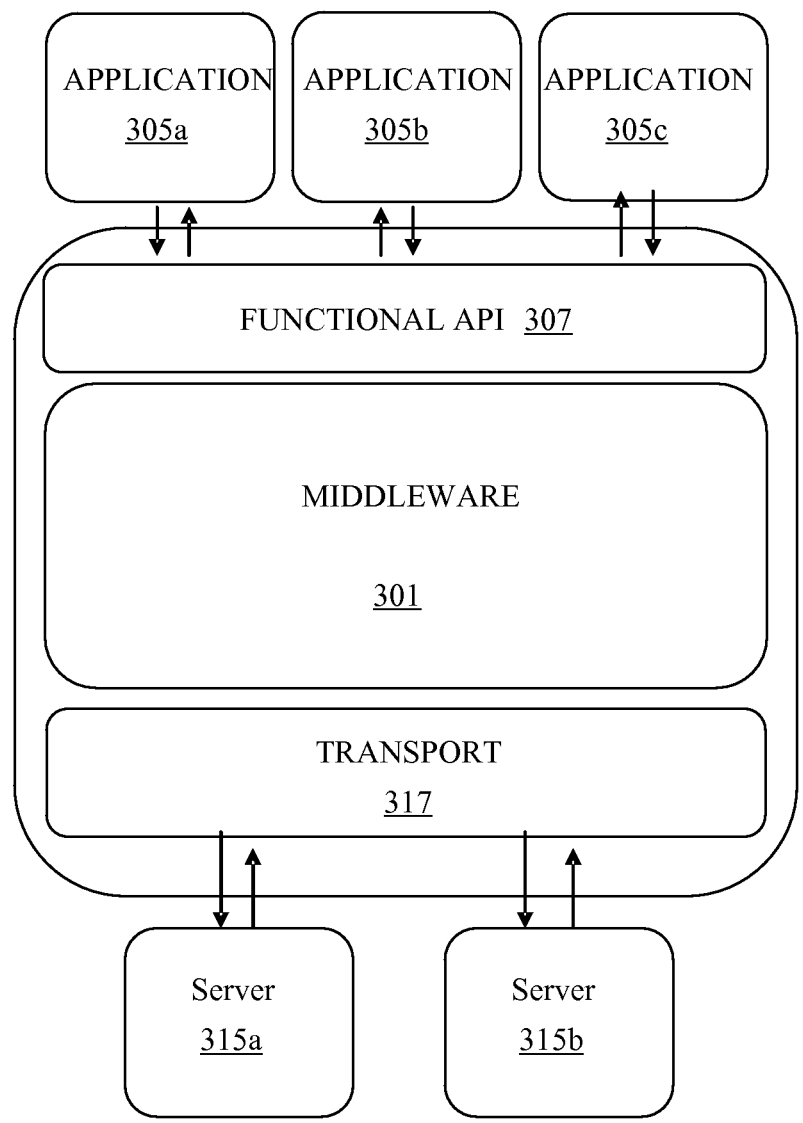
FIG. 3 is a block diagram illustrating components of an application middleware and interactions with other components according to one or more aspects described herein.

FIG. 3 is a block diagram illustrating a middleware component 301. Among other capabilities, middleware component 301 may coordinate communication, data, messages, and user interaction between one or more content servers 315a and 315b and one or more applications 305a, 305b and 305c executing on the mobile terminal device. Middleware component 301 may expose one or more functional APIs, such as API 307, to provide an application 305 with a standardized interface for performing advertisement related functions. For example, the functional API 307 may publish a function called GET_ADVERTISEMENT that directs the middleware component 301 to obtain one or more advertisements based on one or more specified parameters. Other functions may also be published through functional API 307 including DISPLAY_ADVERTISEMENT that directs middleware 301 to display an advertisement on a display of a mobile terminal device and ADD_CREDIT which instructs middleware 301 to add credit or loyalty points to a user's account. Credit and/or loyalty points may be added based on factors such as a number of advertisements viewed on the device.

The middleware component 301 may also interact with a server 315a or 315b through a transport layer 317 which may include a plurality of transport mechanisms and/or protocols including HTTP, FTP, SMS, Bluetooth, WLAN, Radio Frequency Identification (RFID), RSS, or 2D Barcode. For example, middleware component 301 may determine that there are no advertisements available in the device's storage. As such, middleware 301 may connect to an advertisement server 315a to request additional advertisements. The request may be issued through the transport layer 317 which may provide multiple protocols for making such a request. In another example, middleware 301 may periodically update an advertisement server 315a with loyalty information associated with a particular user or device through the transport layer 317. In general, transport layer 317 may facilitate any communications with external devices or entities.

Alternatively or additionally, middleware component 301 may include or interact with a hardware API to instruct various hardware components to perform certain functions or tasks. In one or more instances, an application may call a DISPLAY_ADVERTISEMENT function. In response, middleware 301 may interface with a display component through the hardware API to display a specified advertisement. The processes and interfaces shown in FIG. 3 are for illustrative purposes, and those of skill in the art will appreciate that middleware component 301 may support additional processes, components and interfaces in addition to those shown.

Further, middleware component 301 exposes one or more APIs to application programs 305a, 305b and 305c executing on the mobile terminal device. Application programs 305a, 305b and 305c may be implemented on a variety of platforms including Symbian and J2ME. Each application program 305a, 305b and 305c may contain predefined programming to facilitate interfacing with the middleware component 301 using the exposed APIs. The functional APIs associated with middleware 301 may be published to the public or a group of developers to allow them to implement the proper programming in applications 305a, 305b and 305c to utilize the functionalities of middleware 301. Thus, applications 305a, 305b and 305c might not need to implement the functionalities already provided by the middleware component 301. For example, applications might not need to include programming to perform functions such as storing user profiles and interfacing with software and hardware subsystems. Advantages of using the functionalities of component 301 may include a reduction in load on the overall operating system of the underlying device.

Figure 4:
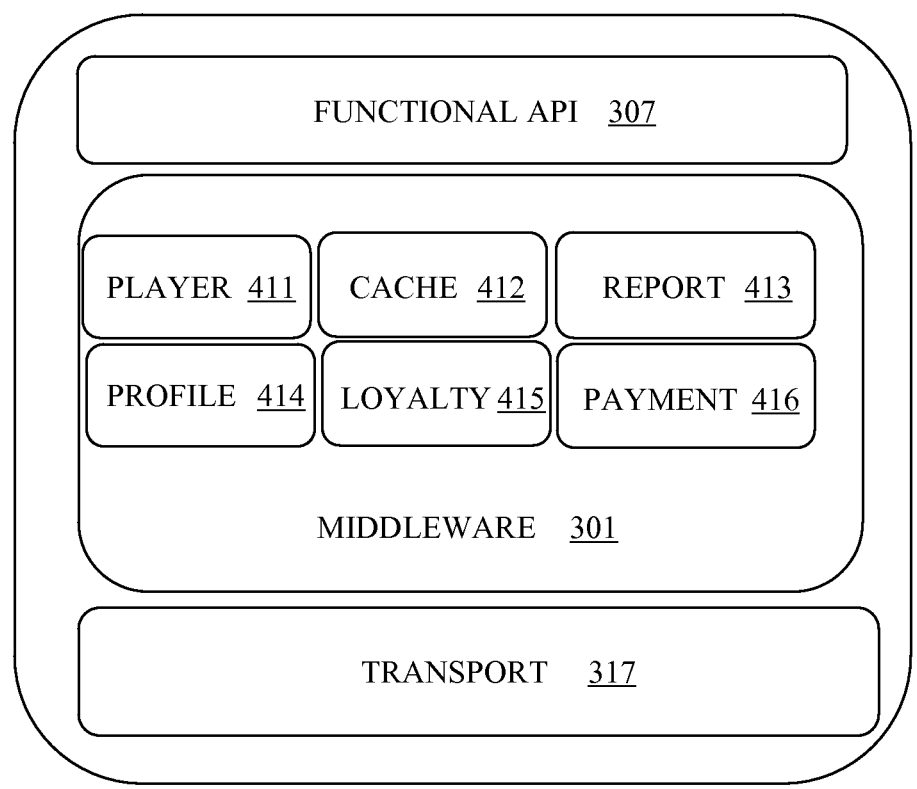
FIG. 4 illustrates a block functionality diagram of an advertising middleware component according to one or more aspects described herein.

FIG. 4 is a block diagram illustrating architecture of a middleware component, such as component 301 of FIG. 3. Middleware component may include a player module 411, a cache module 412, a report module 413, a profile module 414, a loyalty module 415, and/or a payment module 416. In addition, middleware component 301 may interface with a content server 315 (not shown), e.g., advertising server, via transport mechanism 317, as well as with the user of the mobile terminal device via one or more end-user interfaces such as keys, buttons, dials, display screens, speakers, etc., of the mobile terminal device.

As described above, functional API 307 may interface with one or more application level programs (not shown). This interaction may be controlled and/or directed by a user of the mobile terminal device on which the one or more applications are executing via one or more end-user interfaces. Function calls and requests by the applications through functional API 307 may be routed directly to the module of the middleware component to which it corresponds, as further described below. Alternatively or additionally, the middleware component 301 may include a manager module (not shown) that initially receives the request or input from the application via the functional API 307 and directs the request to the applicable module of the middleware component 301. While specific APIs are called out and described herein, those of skill in the art will appreciate that additional or different APIs may be used.

Player module 411, in an illustrative embodiment, is responsible for displaying or otherwise providing one or more advertisements to the application. Player module 411 may receive a request from an application via the functional API 307 to display or provide advertisements. In response, player module 411 may extract from the request one or more parameters, such as the type of advertisement to be provided, e.g., full screen, banner, ticker, or widget; duration for displaying or playing advertisement; position and/or size of advertisement to be displayed; and interval for refreshing the advertisement or for providing new advertisements. Some parameters may be optional and may be used with pre-defined default values if left unspecified.

Player module 411 may subsequently select one or more advertisements in accordance with the parameters from a cache module 412 that stores advertisements. Cache module 412 may be implemented as a database with retrieval functions to facilitate the selection of advertisements based upon the parameters. If cache module 412 is empty or does not contain any advertisements fitting the parameters requested by the application, player module 411 or cache module 412 may retrieve one or more advertisements from a server (e.g., server 315a of FIG. 3) via a transport mechanism 317 in accordance with the parameters specified in the initial request. Additional parameters may be extracted from the device, such as usage and user profile information, and may be provided to the server to facilitate delivery of optimized content.

For example, parameters relating to gender may be extracted from user profile information to determine the advertisement preferences based upon the gender of the user. These parameters may be used to retrieve, or place a higher priority for retrieving, advertisements targeted to a male audience, and/or not retrieve, or place a lower priority in retrieving, advertisements targeted exclusively to a female audience. Additionally, or alternatively, the cache module 412 may periodically retrieve new advertisements from the server based on previously used parameters.

For example, the usage information transmitted to the server may reveal that a significant portion of advertisements being displayed in an application has been regarding sports equipment in a banner-type advertisement. The cache module 412 may periodically, e.g., every five hours, retrieve new advertisements from the server regarding sports equipment in a banner-type format. Alternatively, the cache module 412 may opt to retrieve non-sports equipment related advertisements to provide more variety to the cache pool. By prefetching content, future retrieval of advertisements from the cache by the player module 411 may be greatly expedited.

Additionally, or alternatively, the cache module 412 may periodically retrieve content from nearby servers based upon changes in the mobile device's location, such as automatically retrieving new advertisements from a nearest content server with respect to the mobile device. For example, a user at a supermarket may receive advertisements on the weekly specials at the supermarket on her mobile device that were retrieved by the cache module 412 via a transport mechanism, e.g., WLAN, from an advertising server located in the store. Retrieved advertisements may be stored in cache module 412 for later use by player module 411.

Once player module 411 has received one or more advertisements in accordance with the parameters from cache module 412 or an external advertisement server, player module 411 may display or play the advertisement in the application or otherwise provide the one or more advertisements to the requesting application. In one or more arrangements, the advertisement may include an animation or video clip. In such arrangements, the advertisement may be played using various hardware devices including a display and speakers of the device.

Report module 413 monitors and tracks usage of the middleware component 301 and the middleware modules. Report module 413 may receive or collect usage information from other middleware modules 411, 412, 414, 415 and/or 416. The usage information may include, for example, which advertisements have been provided by player module 411 to the requesting application or user. The information may be gathered at any desired time, e.g., periodically, whenever content is requested, etc., and stored in cache module 412 or another database. Middleware component 301, e.g., via report module 413, may expose one or more APIs to allow an application to access and/or retrieve usage information from the database or allow the application to request authorization, initiation and/or stoppage of the usage monitoring. Additionally, information collected by report module 413 may further be transmitted to one or more advertisement servers. With the collected information, the servers may, for example, analyze statistics of service usage.

Profile module 414 stores and manages user profile information including user behavior and interactions and user preferences. Some or all of the information may be gathered from another middleware module, e.g., report module 413. In one example, middleware component 301, via profile module 414, may expose one or more APIs to allow an application and user to update the user or device's profile information, including preferences. Profile information may also be transmitted to a server, e.g., via player module 411, to facilitate retrieval of targeted advertisements from the server. For example, profile module 414 may collect data regarding the frequency with which the user or device requests and views advertisements. Profile module 414 may further collect information related to what types of advertisements are typically viewed and/or requested. Using such data, relevant advertisements may be retrieved from an advertisement server.

Loyalty module 415 stores and manages user loyalty information to facilitate providing the user with rewards or incentives for certain user interactions with advertisements. Some or all of the information used and/or stored by loyalty module 415 may be gathered from another middleware module (e.g., report module 413) or from the advertisements (e.g., rewards specified in metadata associated with the advertisements). Middleware component 301, e.g., via loyalty module 415, may expose one or more APIs to allow applications and/or the user to access the loyalty information. Additionally, loyalty information may be transmitted to the server 315 which may subsequently relay the information to the appropriate advertisers. For example, user interactions such as following a link in an advertisement or making a purchase with an advertiser, may entitle the user to rewards including receiving extra mobile minutes, discounts from the advertiser, or application-specific rewards (e.g., extra lives in a video game application).

Payment module 416 stores and manages payment information. For example, payment module 416 may store and manage payment data to facilitate payment of fees to application developers for advertisements provided to the user via one or more applications a developer created. For example, developers may be paid based on the number of views or click-throughs the advertisements generated, and/or commission based on sales transactions. Some or all of the information may be gathered from another middleware module, e.g., report module 413. The information may further be transmitted to an advertising server 315 to facilitate payment processing.

Each block within component 301 may be implemented in software via computer executable instructions stored in a memory, or via hardware, e.g., as one or more ASICs, or the like. The functional modules illustrated in FIG. 4 are but one possible embodiment, as functionality may be combined across modules, or split to create even more functional modules. Some modules may be optional, and additional modules may be added. The scope of the invention is not limited to the illustrative embodiment of FIG. 4.

Figure 5:
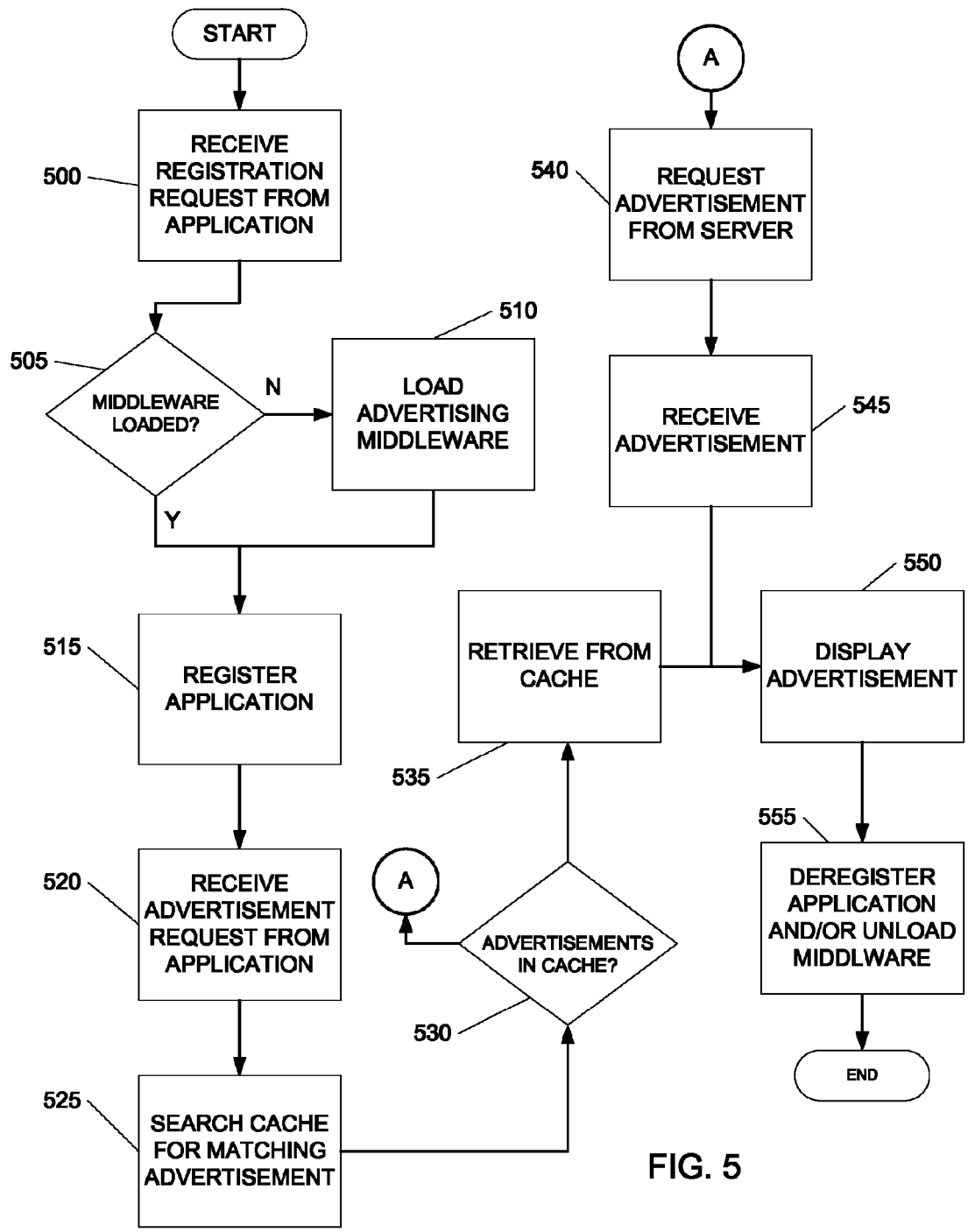
FIG. 5 illustrates a flow chart of a method for providing relevant advertisements to a requesting application via a middleware component according to one or more aspects described herein.

FIG. 5 is a flowchart illustrating a method for providing relevant advertisements to a requesting application via a middleware component such as component 301 in FIGS. 3 and 4. In step 500, a registration request may be received from an application. For example, an application, upon loading or boot-up, may call an NAD_REGISTER( ) function to register with a known middleware component. An application may be aware of the middleware component based on, for example, system wide broadcasts or advertisements from the middleware component. In step 505, a determination is made as to whether the middleware component has been loaded. If the middleware component has not been loaded, then in step 510, the middleware component is initialized and loaded. In one or more arrangements, the middleware component may be configured to automatically load upon startup of the mobile terminal device or alternatively or additionally, may be built-in to the operating system. Thus, if the middleware component is already loaded when the registration request is made by the application, the middleware component may register the application in response in step 515.

For example, the requesting second application may be assigned a unique identifier to differentiate the requesting second application from other applications, e.g., the aforementioned first application. In step 520, the middleware component may receive a request for one or more advertisements, including values associated with a list of parameters such as type, duration, position, and interval from the application via a functional API. This request may be sent directly to a player module or alternatively, to a manager module which directs the request to the player module. In step 525, the middleware component or a module thereof searches a cache for one or more advertisements in accordance with the parameters. In step 530, a determination is made as to whether the cache contains a relevant advertisement matching the specified parameters.

If the cache is empty or no advertisements are identified as fitting the parameters from the cache in step 530, the middleware component may then, in step 540, transmit a request for one or more advertisements to an advertising server via a transport mechanism such as HTTP. In step 545, one or more advertisements are received from the advertising server through the transport layer and stored in the cache. In step 550, the selected advertisements are displayed to the user according to, for example, the parameters received in step 520. Alternatively, if a relevant advertisement is available in the cache from step 530, the relevant advertisement is retrieved from the cache in step 535 and displayed in step 550. In step 555, the middleware component may receive a deregistration message from the second application via an NAD_DEREGISTER( ) function if, for example, the application is being closed by a user. In one or more arrangements, if the middleware component is not being used by other application, the middleware component may be unloaded from memory. Where other application(s) are still registered or communicating with the middleware component, the middleware might not be unloaded. Alternatively, the middleware component may remain resident in memory until the mobile device is powered off.

Figure 6:
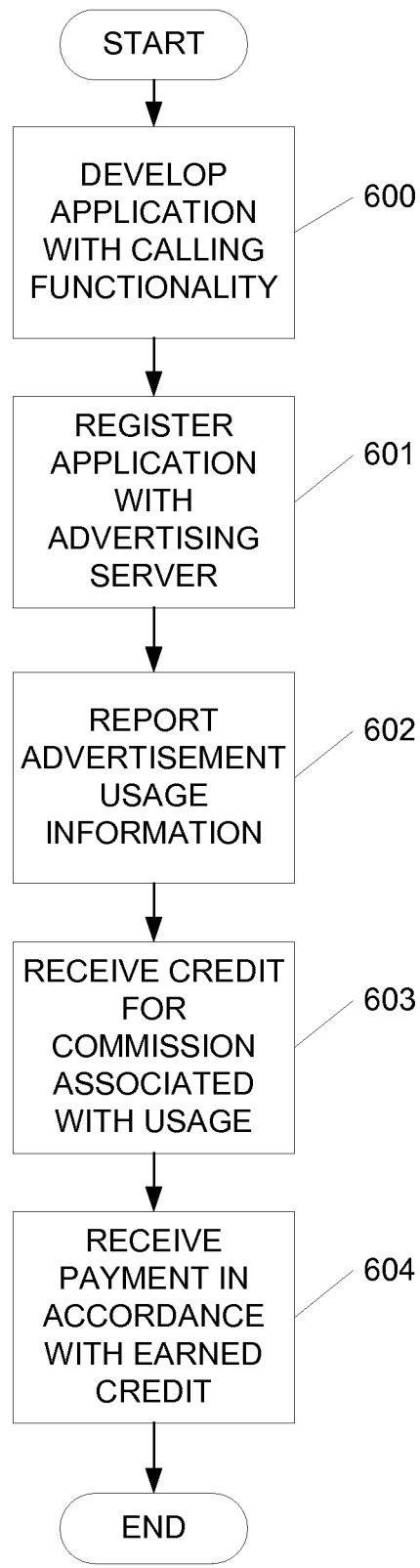
FIG. 6 is a flowchart illustrating a method for providing incentives to application developers according to one or more aspects described herein.

FIG. 6 is a flowchart illustrating a business model for generating revenue for developers of mobile applications that display advertisements via the middleware component. In step 600, a developer implements calling functionality into her application enabling the application to interface with a middleware component through a standardized functional API. Developers may be able to access the middleware component if, for example, the middleware component and functional API are publicly available and downloadable free of charge. In step 601, a developer registers the application with an advertising server to set up payment information. For example, the developer may sign up an account on the server under a payment schedule that pays commission based upon total views or click-throughs of advertisements displayed in its application. In step 602, the application communicates with the server via the middleware component and sends user report information such as user views and click-throughs of advertisements to the server. In step 603, a credit may be applied to the developer's account with any commission generated from the displayed advertisements. In step 604, the developer is paid the amount owed in his account. A minimum amount owed may be required before payment is made. In one or more arrangements, a level of payment may also be associated with the functionalities or complexities of the developer's applications. For example, an application with more functions such as music and games may be provided a greater payout than an application that is dedicated to displaying advertisements.

The methods and features recited herein may further be implemented through any number of computer readable mediums that are able to store computer readable instructions. Examples of computer readable mediums that may be used include RAM, ROM, EEPROM, flash memory or other memory technology, CD-ROM, DVD or other optical disk storage, magnetic cassettes, magnetic tape, magnetic storage and the like.

The following example provides an illustrative implementation of certain aspects of the present invention. A developer has invested a great deal of time, resources, and money into producing a massive multi-player game that runs on mobile devices and wishes to generate revenue from the game. The developer could charge a price for purchasing the game or a periodic subscription fee to play the game, but such business models would likely not reach as wide a user-base as a game distributed without charge. Thus, the developer may instead, or additionally as an option, offer a version of the game free of charge, but one that is supported through advertisements displayed in the game. The developer could implement such functionality directly into the game, but doing so would be costly and complex, as the developer will have to account for various software and hardware platforms, advertisement formats, server specifications, etc. Instead, the developer may simply implement a function in the game, e.g., GET_ADVERTISEMENT( ), to call the advertisement middleware to display advertisements according to any desired parameters.

For example, the game may request that ticker-type (TYPE) advertisements be displayed at the bottom of the game screen (POSITION), to minimize obstruction of the game, while the game is being played (DURATION), with a one-minute refreshment rate for new advertisements (INTERVAL). Such an example shows four parameters for displaying the advertisement. The player module of the middleware, upon receiving the request from the game, selects from the cache module advertisements fitting the parameters, i.e., ticker-type. If the cache is empty, or no content is selected as fitting the parameters provided, the cache module downloads new advertisements, e.g., via HTTP, from an advertising server. Additional information from other middleware modules is transmitted to the server to ensure that advertisements downloaded are targeted to the user, such as user profile information gathered from user registration in the game. Once advertisements are selected by the player module, either from the cache or from the server, they are displayed to the user in the game according to the other parameters requested, e.g., bottom of screen. As such, the developer registers this application with the advertising server and sets up an account where future earnings may be credited.

Assume, for example, that an advertisement for a MP3 player is displayed in the game. The user of the mobile device decides to follow the link in the advertisement, and liking what she sees, purchases the MP3 player. The user profile module tracks the interaction, e.g. via the report module, and updates the user profile information to reflect the purchase/click-through. This information may be transmitted to an advertising server by the middleware to retrieve future advertisements relating to this purchase/click-through, such as accessories for MP3 players, other portable players, etc. The loyalty module tracks the purchase and rewards the player in the game, such as giving the player some game-currency, with the amount dependent upon the purchase price, e.g., higher purchases are rewarded by higher awards, or the number of click-throughs or ad-views. Additionally, the user may be given future discounts on products purchased from the same advertiser. Finally, the payment module tracks the view, click-through, and purchase generated by this advertisement and transmits the information to the advertising server, which credits the developer's account for any revenue generated from the view and click-through, and commission fee associated with the purchase.

Such an implementation benefits all parties involved. Users can play the game for free and receive bonuses, rewards, or discounts for interacting with advertisers. A developer can capitalize on revenue opportunities that otherwise would not be possible through traditional business avenues or are practically unfeasible given the complexity of implementing advertising functionality directly into its game. Finally, advertisers can reach a vast consumer-base for relatively little cost and gains wide exposure from users interacting with the advertisements.

The present invention has been described in terms of preferred and exemplary embodiments thereof. Numerous other embodiments, modifications and variations within the scope and spirit of the appended claims will occur to persons of ordinary skill in the art from a review of this disclosure.

I claim:

1. A method, comprising:
receiving, at a middleware component, an advertisement request from an application, the advertisement request including one or more parameters wherein the middleware component and the application are included in a mobile communication device;
selecting, at the middleware component, one or more advertisements from a database, wherein the selection is based on the one or more parameters; and
providing the selected one or more advertisements to the application in accordance with the one or more parameters.

2. The method of claim 1, further comprising transmitting a request for one or more advertisements to an advertisement server in accordance with the one or more parameters.

3. The method of claim 2, further comprising:
receiving the requested one or more advertisements from the advertisement server; and storing, at the middleware component, the one or more advertisements from the advertisement server in the database.

4. The method of claim 1, further comprising outputting the selected one or more advertisements to an end-user interface in accordance with the one or more parameters.

5. The method of claim 1, further comprising providing usage information to at least one of the application or an advertisement server.

6. The method of claim 5, further comprising providing user profile information to at least one of the application or the advertisement server.

7. The method of claim 1, further comprising tracking, at the middleware component, loyalty information.

8. The method of claim 1, further comprising tracking, at the middleware component, payment information associated with the usage information.

9. An apparatus comprising:
a processor; and
memory operatively coupled to the processor, the memory storing computer readable instructions that, when executed, cause the apparatus to:
receive, at a middle-ware component of a mobile communication device, a request for advertisements from one or more applications of the mobile communication device through one or more application interfaces, the request including one or more advertisement parameters;
select one or more advertisements from an advertisement cache in accordance with the one or more advertisement parameters; and
provide the selected one or more advertisements to the one or more applications.

10. The apparatus of claim 9, wherein the computer readable instructions, when executed, further cause the apparatus to request one or more advertisements from a server in accordance with the one or more advertisement parameters.

11. The apparatus of claim 10, wherein the computer readable instructions, when executed, further cause the apparatus to:
receive the requested one or more advertisements from the server; and
store the requested one or more advertisements from the server in the advertisement cache.

12. The apparatus of claim 9, further comprising a report module configured to track usage information.

13. The apparatus of claim 9, further comprising a user profile module configured to track user profile information.

14. One or more computer readable media storing computer-executable instructions that, when executed by a processor, provide an advertising middleware configured to:
receive a request for advertisements from the one or more applications of a mobile communication device through one or more application interfaces, the request including one or more advertisement parameters. wherein the advertising middleware is included in the mobile communication device;
select one or more advertisements from an advertisement cache in accordance with the one or more advertisement parameters; and
providing the selected one or more advertisements to the one or more applications.

15. The one or more computer readable media of claim 14, wherein the computer readable instructions, when executed, further cause the apparatus to request one or more advertisements from an advertisement server in accordance with the one or more advertisement parameters.

16. The one or more computer readable media of claim 15, wherein the computer readable instructions, when executed, further cause the apparatus to:
    receive the one or more requested advertisements from the advertisement server; and store the requested one or more advertisements in the advertisement cache.

17. The one or more computer readable media of claim 14, wherein the advertising middleware further comprises a report module configured to track usage information.

18. The one or more computer readable media of claim 14, wherein the advertising middleware further comprises a user profile module configured to track user profile information.

19. A method comprising:
    implementing, at a computing device, interface functionality into an application to provide one or more advertisements via an advertisement middleware;
    registering, by the computing device, the application with a server;
    the advertisement middleware providing a report to the server, wherein the report indicates a number of advertisements displayed via the application; and
    determining a revenue generated from the one or more advertisements based on the report.

20. The method of claim 19, wherein the report indicates a number of click-throughs.

21. The method of claim 19, wherein the advertisement middleware and the application are included in a same device.

22. The method of claim 21, wherein the same device is the computing device.

23. One or more computer readable media storing computer readable instructions that, when executed, cause an apparatus to:
    implement, at a computing device, interface functionality into an application to provide one or more advertisements via an advertisement middleware;
    register, by the computing device, the application with a server;
    provide, by the advertisement middleware, a report to the server, wherein the report indicates a number of advertisements displayed via the application; and
    determine a revenue generated from the one or more advertisements based on the report.

24. The one or more computer readable media of claim 23 wherein the report indicates a number of click-throughs.

25. The one or more computer readable media of claim 23, wherein the advertisement middleware and the application are included in the computing device.

26. An apparatus comprising:
    a processor; and
    memory operatively coupled to the processor, the memory storing computer readable instructions that, when executed, cause the apparatus to:
        implement, at a computing device, interface functionality into an application to provide one or more advertisements via an advertisement middleware;
        register, by the computing device, the application with a server;
        provide, by the advertisement middleware, a report to the server, wherein the report indicates a number of advertisements displayed via the application; and
        determine a revenue generated from the one or more advertisements based on the report.

27. The apparatus of claim 26, wherein the report indicates a number of click-throughs.

28. The apparatus of claim 26, wherein the advertisement middleware and the application are included in the computing device.

* * * * *